Jan. 20, 1953     L. W. CLOVER     2,625,950
VALVE
Filed Feb. 21, 1948     2 SHEETS—SHEET 1
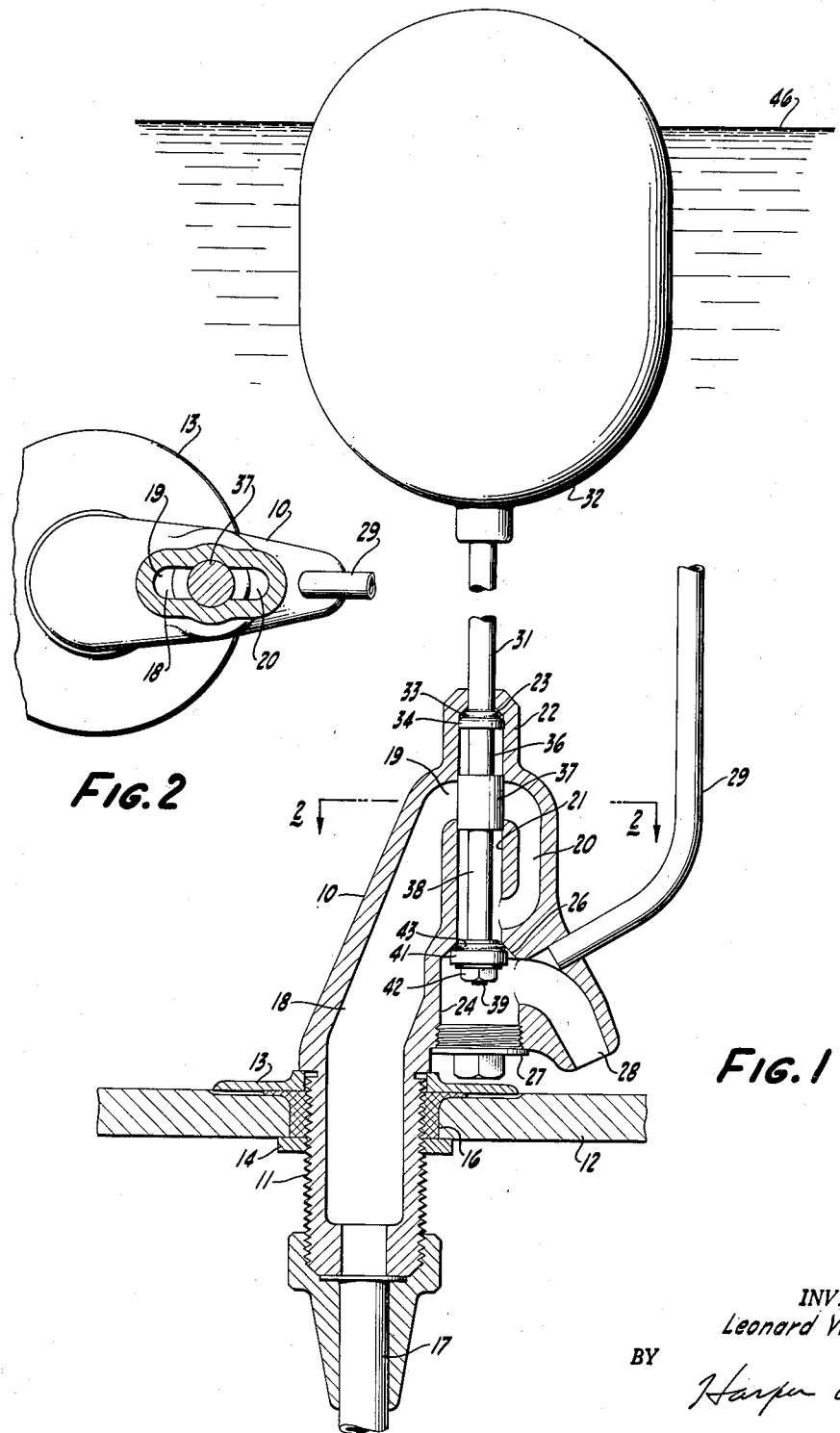
INVENTOR.
Leonard W. Clover
BY
ATTORNEY Jan. 20, 1953     L. W. CLOVER     2,625,950
VALVE
Filed Feb. 21, 1948     2 SHEETS—SHEET 2
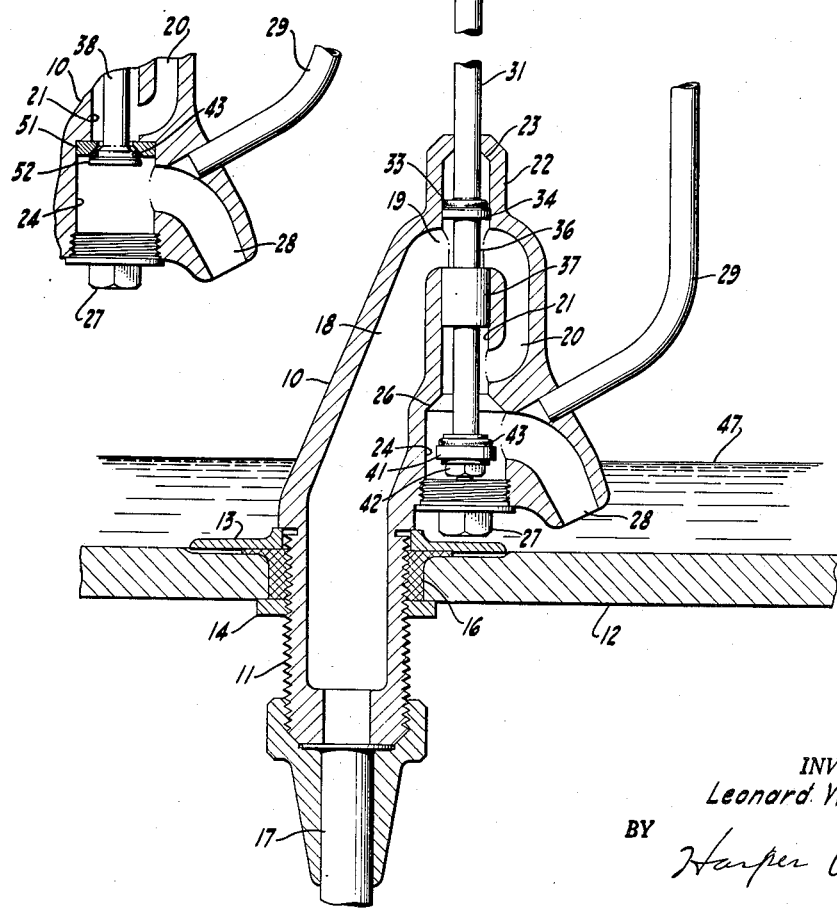
INVENTOR.
Leonard W. Clover
BY Harper Allen
ATTORNEY Patented Jan. 20, 1953

2,625,950

UNITED STATES PATENT OFFICE 2,625,950

VALVE

Leonard W. Clover, San Jose, Calif.

Application February 21, 1948, Serial No. 10,151

2 Claims. (Cl. 137—433)

The present invention relates to valves and is concerned more particularly with a provision of an improved valve adapted for float control.

It is a general object of the invention to provide a valve of a simple inexpensive construction employing a minimum of parts and occupying a minimum of space.

A further object of the invention is to provide a valve of the above character which can be easily installed and can be used as a replacement for similar valves in a convenient manner.

Another object of the invention is to provide a valve of the above character of reliable operation characteristics and which can be used under high pressure conditions.

Other objects and advantages of the invention will be apparent from the following description of a preferred embodiment thereof as illustrated in the accompanying drawings, in which:

Figure 1 is a vertical sectional view showing the valve installed and under control of a float, the valve being shown in closed position.

Figure 2 is a fragmentary sectional view taken as indicated by the line 2—2 in Figure 1.

Figure 3 is a view similar to Figure 1 but showing the valve in its open position.

Figure 4 is a fragmentary sectional view similar to Figures 1 and 3 but illustrating a modified construction of the valve.

Referring to the drawings, the valve includes a valve body 10 of cast construction which is provided with a threaded lower end portion 11 by means of which it can be mounted in the bottom wall 12 of a tank, such as the water tank of a toilet. The mounting is effected by means including a flanged collar 13, a locknut 14 and suitable packing material 16 interposed therebetween and sealing the valve body 10 with respect to the wall 12. The threaded end 11 of the valve also provides for connection to a supply pipe 17 by means of a conventional coupling.

The supply pipe 17 opens into an internal passage 18 within the valve which narrows adjacent the upper end of the valve body 10 into a restricted horizontal portion or crossover passage 19 and then turns downwardly at 20 in a reverse direction to the entrant portion 18 and the passage portion 20 opens into a central bore 21 of the valve body. The central bore 21 is extended into the upper reduced end 22 of the body and terminates in a seat 23 for a purpose later described. Adjacent its lower end the bore 21 is provided with an enlarged portion 24 below a valve seat 26. A plug 27 is threadedly engaged in the lower end of the enlarged bore portion 24. From the enlarged bore portion 24 a downwardly and outwardly extending outlet passage 28 is provided and from this passage a conventional siphon tube 29 leads upwardly in the usual manner in a toilet tank.

The central bore of the valve body carries a one-piece valve member 31 which is attached at its upper end to a float 32 in any convenient manner. The valve member or rod 31 extends through a central opening in the upper extension 22 of the valve body and is provided with a seat for a seal ring 33 of resilient material such as synthetic rubber. The ring 33 provides a poppet-type valve for cooperation with the seat 23. An enlarged cylindrical guide portion 34 is provided on the valve member immediately adjacent the seal ring 33. Immediately below the cylindrical guide portion 34 there is a valve rod portion 36 of reduced diameter which is of a dimension slightly greater in length than the vertical dimension of the horizontal passage portion 19. Immediately below the valve portion 36 of reduced diameter, a cut-off or piston valve portion 37 is provided which has a close sliding fit within the bore 21 and is of a length greater than the vertical dimension of the horizontal passage portion 19 so as to close this passage portion in the position shown in Figures 1 and 2. The cut-off valve portion 37 is followed by a lower valve rod portion 38 of reduced diameter which terminates at its lower end in a reduced threaded portion 39 which receives a collar 41 held thereon by a locknut 42. The collar 41 provides a mounting for a seal ring 43 similar to the ring 33 and providing a poppet-type valve for engagement with the valve seat 26. The relative spacing is such that the ring 43 engages the seat 26 at substantially the same time that the ring 33 engages the seat 23.

In operation with the valve closed as seen in Figure 1, the flow of water or other liquid is shut off and will remain shut off as long as the float 32 or other suitable instrumentality maintains the valve rod in its raised position.

Assuming that the tank or other reservoir is opened for discharge of the liquid so that the liquid level falls from its high position shown at 46 in Figure 1 to its low position shown at 47 in Figure 2, the valve rod 31 is moved downwardly so that the piston cut-off portion 37 recedes into the center portion of the bore 21 and the passage portion 19 is opened. Also the valve portions 33 and 43 are moved off of their respective seats. With the valve open as shown in Figure 3, the water can flow upwardly through passage 18, across passage 19, down through the passage 20, into the bore 21, and past the valve seat 26 for discharge through the passage 28 below the level of the liquid in the tank. During this operation the valve rod 31 is resting on the plug 27 and will remain there until it is again lifted by the rising level of the water.

As the float 32 rises with the water, it lifts the valve rod or stem 31 and elevates the cylindrical cut-off portion 37 so that it begins to throttle or restrict the flow of liquid through the passage. The flow is further reduced as the float 32 rises and lifts the valve rod or stem until a fully closed condition of the valve occurs as shown in Figure 1. In the closed condition of the valve the portions of the valve subjected to the hydraulic pressure are hydraulically balanced because of the equal areas of the valve stem exposed to the hydraulic pressure, i. e., the annular face at the lower end of the cylindrical guide portion 34, the annular faces at the respective ends of the cut-off valve portion 37, and the portion of the valve 43 which is exposed to the bore 21.

In the modification of the valve shown in Figure 4 a valve seat insert 51 is provided at the upper end of the enlarged portion 24 of the bore for engagement with the seal ring 43 and the diameter of the lower end 52 of the valve is substantially equal to the diameter of the bore.

While I have shown and described certain preferred embodiments of the invention, it is apparent that the invention is capable of variation and modification from the forms shown so that its scope should be limited only by the scope of the claims appended hereto.

I claim:

1. In a valve, a body having a longitudinal bore extending therethrough provided with respective valve seats adjacent the ends thereof, a discharge passage means leading from one of said seats, inlet passage means in said body intersecting said bore between said seats and thereafter opening into said bore adjacent said one seat, and a valve member in said bore, said valve member having respective valve portions for cooperation with said respective seats, said valve member also having a piston valve portion slidable in said bore and an adjacent portion of reduced diameter, said piston valve portion and said portion of reduced diameter being selectively movable into operative relation with said inlet passage means at the intersection thereof with said bore to close and open the valve.

2. In a valve, a body having a longitudinal bore extending therethrough provided with respective valve seats adjacent the ends thereof, a discharge passage means leading from one of said seats, inlet passage means in said body intersecting said bore between said seats and thereafter opening into said bore adjacent said one seat, and a valve member in said bore and extending from one end of said body through the other of said valve seats, said bore having respective valve portions for cooperation with said respective seats, said valve member also having a piston valve portion selectively movable into passage closing relation with respect to said inlet passage at the intersection thereof with said bore.

LEONARD W. CLOVER.

REFERENCES CITED

The following references are of record in the file of this patent:

UNITED STATES PATENTS

| Number | Name | Date |
|---|---|---|
| 573,530 | Porteous | Dec. 22, 1896 |
| 973,511 | Johnson | Oct. 25, 1910 |
| 1,477,578 | Marsh | Dec. 18, 1923 |
| 1,613,293 | Reif | Jan. 4, 1927 |
| 1,920,047 | Zoerb | July 25, 1933 |
| 2,081,878 | Wittek | May 25, 1937 |
| 2,350,905 | Koehler | June 6, 1944 |